(12) United States Patent
Liao et al.

(10) Patent No.: US 11,936,505 B2
(45) Date of Patent: Mar. 19, 2024

(54) DECISION FEEDBACK EQUALIZATION WITH EFFICIENT BURST ERROR CORRECTION

(71) Applicant: CREDO TECHNOLOGY GROUP LTD, Grand Cayman (KY)

(72) Inventors: Yu Liao, Longmont, CO (US); Junqing Phil Sun, Cupertino, CA (US)

(73) Assignee: Credo Technology Group Limited, Grand Cayman (KY)

( * ) Notice: Subject to any disclaimer, the term of this patent is extended or adjusted under 35 U.S.C. 154(b) by 4 days.

(21) Appl. No.: 17/657,862

(22) Filed: Apr. 4, 2022

(65) Prior Publication Data

US 2023/0318883 A1 Oct. 5, 2023

(51) Int. Cl.
H04L 25/03 (2006.01)

(52) U.S. Cl.
CPC .. H04L 25/03057 (2013.01); H04L 25/03324 (2013.01)

(58) Field of Classification Search
CPC ......... H04L 25/03006; H04L 25/03019; H04L 25/03057; H04L 25/03267; H04L 25/03324
USPC ....... 375/232, 233, 340, 341, 346, 348, 350; 708/322, 323
See application file for complete search history.

(56) References Cited

U.S. PATENT DOCUMENTS

| | | | |
|---|---|---|---|
| 5,757,855 A * | 5/1998 | Strolle | H04L 25/03267 375/262 |
| 6,201,832 B1 * | 3/2001 | Choi | G11B 20/10046 375/232 |
| 8,301,036 B2 | 10/2012 | He | |
| 8,428,113 B1 * | 4/2013 | Katic | H04L 27/01 708/304 |
| 8,638,886 B2 | 1/2014 | He | |
| 9,935,800 B1 | 4/2018 | He | |
| 10,680,856 B1 | 6/2020 | Miao | |
| 10,892,763 B1 * | 1/2021 | Hidaka | H03L 7/087 |
| 11,005,567 B2 | 5/2021 | Sun | |

(Continued)

OTHER PUBLICATIONS

U.S. Appl. No. 17/656,751 as filed in U.S. Patent and Trademark Office, filed Mar. 28, 2022 by inventors Yu Liao and Junqing Sun, titled: "Reduced-Complexity Maximum Likelihood Sequence Detector Suitable for M-ary Signaling".

*Primary Examiner* — Young T. Tse
(74) *Attorney, Agent, or Firm* — Ramey LLP; Daniel J. Krueger

(57) ABSTRACT

Receivers, methods, and cores, can provide decision feedback equalization with efficient burst error correction. An illustrative receiver includes: a decision feedback equalizer that derives symbol decisions from a receive signal; a subtractor that determines an equalization error for each said symbol decision; and a post-processor that operates on the symbol decisions and equalization error to detect and correct symbol decision errors. An illustrative receiving method includes: using a decision feedback equalizer to derive symbol decisions from a filtered receive signal; determining an equalization error for each said symbol decision; and processing the symbol decisions and equalization error to detect and correct symbol decision errors. An illustrative semiconductor intellectual property core generates circuitry for implementing a receiving and method as described above.

20 Claims, 5 Drawing Sheets

(56) References Cited

U.S. PATENT DOCUMENTS

| | | |
|---|---|---|
| 11,218,186 B2 | 1/2022 | Lin |
| 11,451,417 B1 * | 9/2022 | Sun .................. H04L 25/03057 |
| 2005/0220185 A1 * | 10/2005 | Dowling ........... H04L 25/03057 |
| | | 375/232 |
| 2022/0224571 A1 * | 7/2022 | Nitsch ............... H04L 25/03057 |

* cited by examiner

FIG. 1
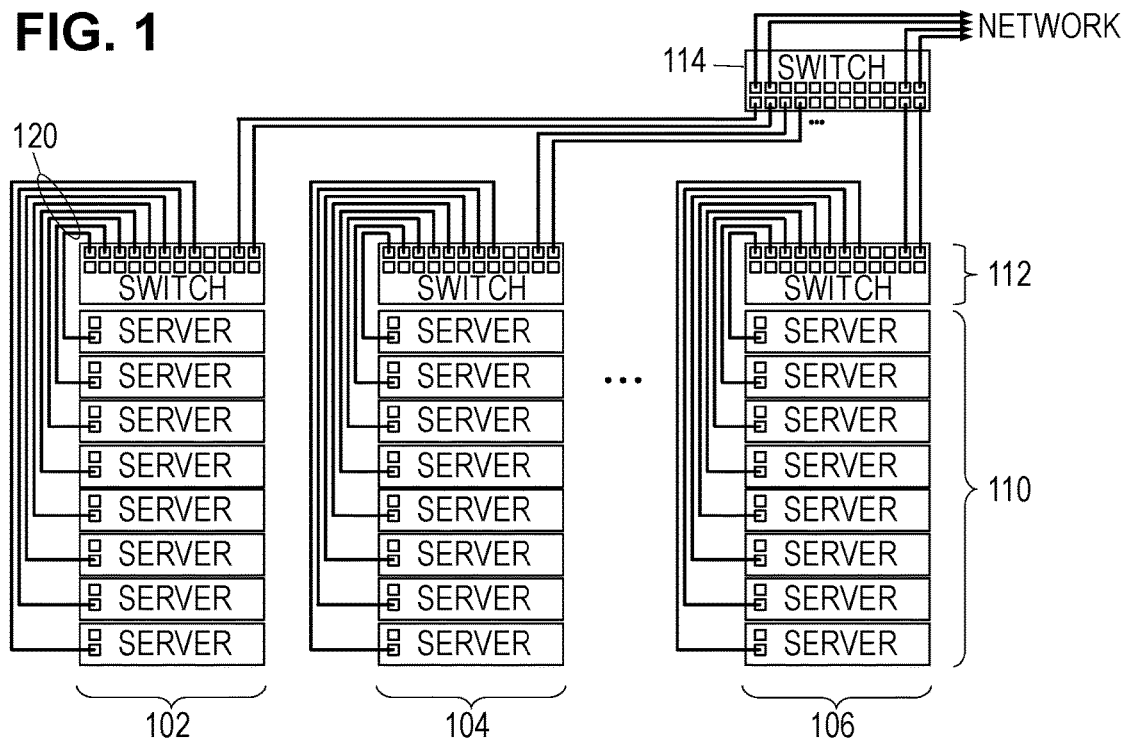
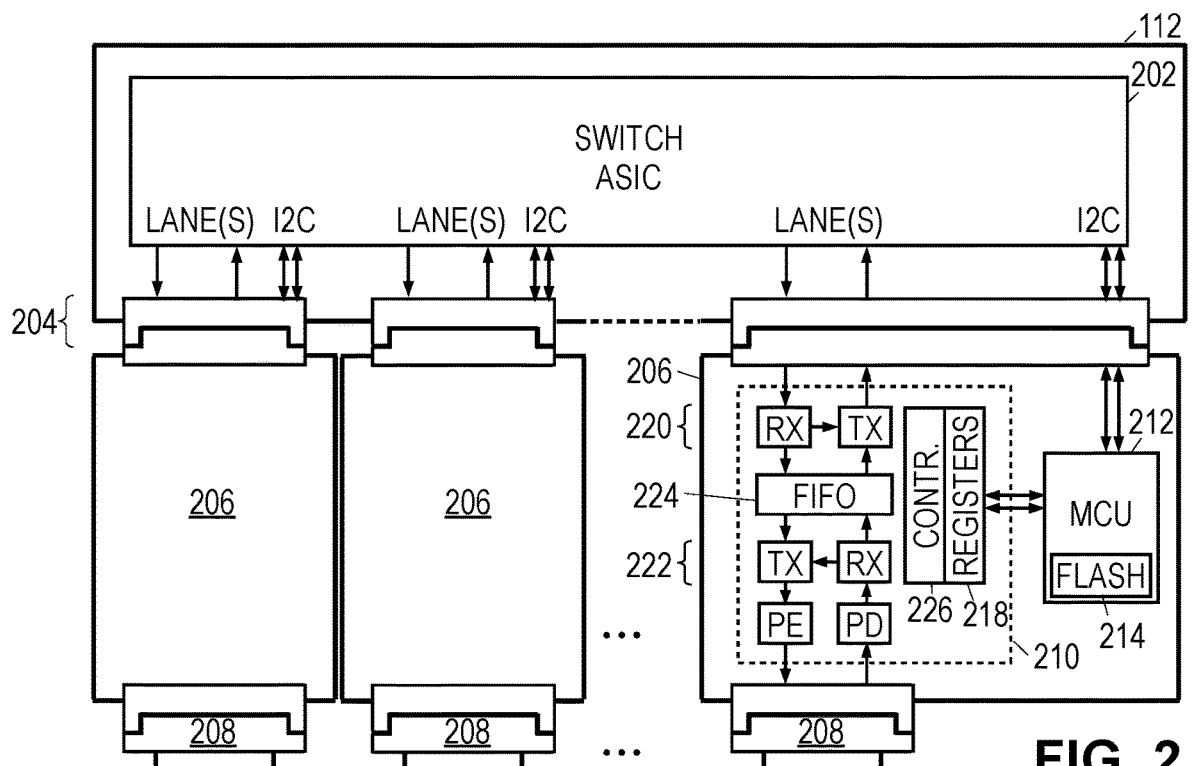
FIG. 2

DECISION FEEDBACK EQUALIZATION WITH EFFICIENT BURST ERROR CORRECTION

TECHNICAL FIELD

The present disclosure relates to digital communications receivers and, more particularly, to equalizers suitable for use with high-rate signaling, and pulse-amplitude modulated (PAM)/quadrature amplitude modulated (QAM) signal constellations.

BACKGROUND

Most integrated circuit devices have become so complex that it is impractical for electronic device designers to design them from scratch. Instead, electronic device designers rely on predefined modular units of integrated circuit layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("IP core", "soft macro") but are frequently employed interchangeably.

The modular units can be expressed in different ways, e.g., in the form of a hardware description language (HDL) file, or as a fully-routed design that could be printed directly to a series of manufacturing process masks. Fully-routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully-routed units may offer better predictability in terms of areal requirements, reliability, and performance. While there is no fixed rule, digital module designs are more commonly specified in HDL form, while analog and mixed-signal units are more commonly specified as a lower-level, physical description.

Serializer-deserializer (SerDes) cores are a frequent need for device designs that employ modern data communications standards, which continue to evolve towards higher symbol rates and larger numbers of bits per channel symbol. At higher symbol rates, channel symbols become more attenuated and dispersed as they propagate, causing evermore severe intersymbol interference (ISI) at the receiving end of the channel. When trying to detect the channel symbols, receivers must contend with this ISI in addition to the channel noise that contaminates the receive signal.

Due to their relative low complexities, linear equalizers and decision feedback equalizers (DFE) are typically preferred for facilitating channel symbol detection without undue noise enhancement. Yet as data rates push ever closer to channel capacity, these equalizers may fail to provide sufficiently low error rates. Particularly in high ISI channels, DFEs may suffer from error propagation, causing error bursts that can significantly degrade performance.

SUMMARY

Accordingly, there are disclosed herein receivers, methods, and cores that provide decision feedback equalization with efficient burst error correction. An illustrative receiver includes: a decision feedback equalizer that derives symbol decisions from a receive signal; a subtractor that determines an equalization error for each said symbol decision; and a post-processor that operates on the symbol decisions and equalization error to detect and correct symbol decision errors.

One illustrative receiving method includes: using a decision feedback equalizer to derive symbol decisions from a filtered receive signal; determining an equalization error for each said symbol decision; and processing the symbol decisions and equalization error to detect and correct symbol decision errors.

An illustrative semiconductor intellectual property core generates circuitry for implementing a receiving and method as described above.

Each of the foregoing receiver, method, and core implementations may be embodied individually or conjointly and may be combined with any one or more of the following optional features: 1. the post-processor detects error exit symbols by comparing the equalization error's magnitude to a threshold. 2. the decision feedback equalizer includes a forward filter that shapes a channel response to $1+\gamma D$. 3. the threshold to detect error exit symbols is programmable. 4. the decision feedback equalizer derives M-ary PAM symbol decisions, M>2, and the error exit symbol is limited to 0 and (M−1). 5. the post-processor includes a metric circuit to determine a likelihood difference for each of multiple different error burst lengths. 6. the post-processor includes a corrector circuit that finds the minimum likelihood difference and when appropriate corrects a corresponding number of decision errors preceding the error exit symbol. 7. the metric circuit and corrector circuit are disabled until an error exit symbol is detected. 8. processing includes finding a minimum likelihood difference for each error exit symbol and if the minimum likelihood difference so indicates, correcting a corresponding number of decision errors preceding that error exit symbol.

BRIEF DESCRIPTION OF THE DRAWINGS

FIG. 1 shows an illustrative network.
FIG. 2 is a block diagram of an illustrative switch.

DETAILED DESCRIPTION

Figure 3:
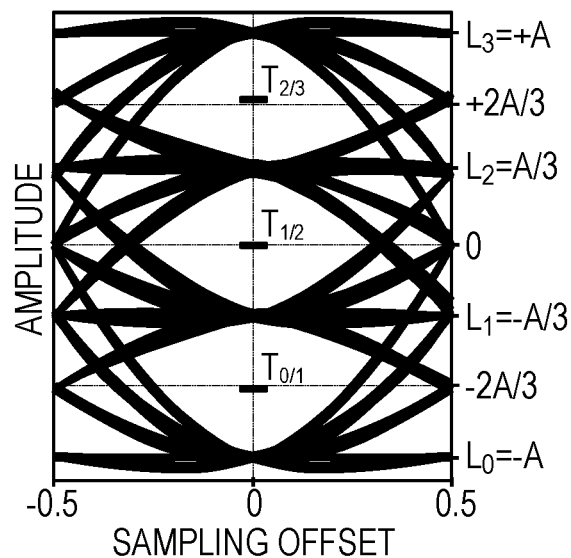
FIG. 3 is an illustrative PAM4 eye diagram.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

For context, FIG. 1 shows an illustrative network such as might be found in a data processing center, with multiple server racks 102-106 each containing multiple servers 110 and at least one "top of rack" (TOR) switch 112. The TOR switches 112 are connected to aggregator switches 114 for interconnectivity and connection to the regional network and internet. (As used herein, the term "switch" includes not just traditional network switches, but also routers, network bridges, hubs, and other devices that forward network communication packets between ports.) Each of the servers 110 is connected to the TOR switches 112 by network cables 120, which may convey signals with symbol rates high enough to cause substantial intersymbol interference (ISI).

FIG. 2 shows an illustrative switch 112 with an application-specific integrated circuit (ASIC) 202 that implements packet-switching functionality coupled to port connectors 204 for pluggable modules 206. Pluggable modules 206 couple between the port connectors 204 and cable connectors 208 to improve communications performance by way of equalization and optional format conversion (e.g., converting between electrical and optical signals). The pluggable modules 206 may comply with any one of various pluggable module standards including SFP, SFP-DD, QSFP, QSFP-DD, and OSFP.

The pluggable modules 206 may each include a retimer chip 210 and a microcontroller chip 212 that controls operation of the retimer chip 210 in accordance with firmware and parameters that may be stored in nonvolatile memory 214. The operating mode and parameters of the pluggable retimer modules 206 may be set via a two wire bus such as 12C or MDIO that connects the microcontroller chip 212 to the host device (e.g., switch 112). The microcontroller chip 212 responds to queries and commands received via the two wire bus, and responsively retrieves information from and saves information to control registers 218 of the retimer chip 210.

Retimer chip 210 includes a host-side transceiver 220 coupled to a line-side transceiver 222 by first-in first-out (FIFO) buffers 224. The transceivers may be SerDes cores having decision feedback equalizers (DFEs) for high baud rate reception. FIG. 2 shows optional photoemitter (PE) and photodetector (PD) modules to convert between optical line-side signals and electrical host-side signals. Though only a single lane is shown in the figure, the transceivers may support multiple lanes conveyed via multiple corresponding optical fibers or electrical conductors. A controller 226 coordinates the operation of the transceivers in accordance with the control register contents, and may provide for multiple communication phases pursuant to a communications standard such as the Fibre Channel Standard published by the American National Standard for Information Technology Accredited Standards Committee INCITS.

FIG. 3 is an illustrative PAM4 eye diagram with three decision thresholds $T_{0/1}$, $T_{1/2}$, $T_{2/3}$, that a DFE may use to distinguish between the four potential channel symbols 0, 1, 2, 3, which have respective target levels $L(0)=-A$, $L(1)=-A/3$, $L(2)=A/3$, and $L(3)=A$. For a nominal signal range of $-A$ to $+A$, the decision thresholds are set at 0 and $\pm 2A/3$. Noise, interference, and other channel effects cause variation in the signal, spreading the signal paths and reducing the size of the eyes, thereby increasing the probability of symbol detection error.

Figure 4:
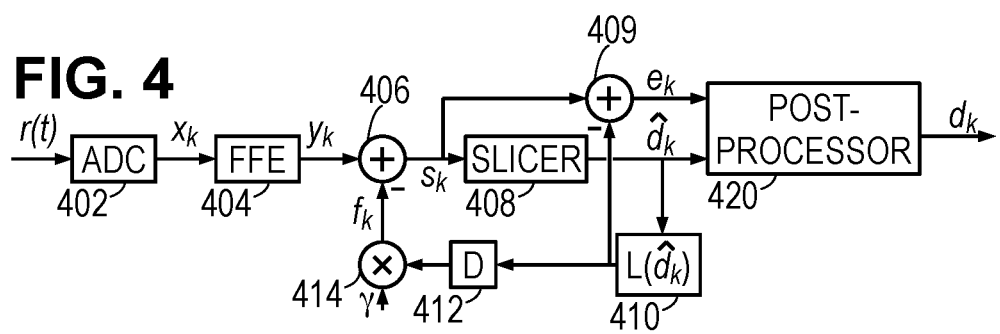
FIG. 4 is a block diagram of an illustrative one-tap DFE with a post-processor.

FIG. 4 shows an illustrative DFE with post-processing. An analog to digital converter (ADC) 402 converts an analog receive signal r(t) to a digital receive signal $x_k$, which may be filtered by a forward equalizer (FFE) 404 to produce a filtered receive signal $y_k$ having minimal leading intersymbol interference (ISI). The FFE 404 can further shape the signal spectrum to limit trailing ISI to one symbol (i.e., a channel response of $1+\gamma D$). That is, the filtered receive signal can be expressed:

$$y_k = L(d_k) + \gamma L(d_{k-1}) + n_k, \qquad (1)$$

where $d_k \in \{0, 1, 2, 3\}$ represents the transmitted PAM4 symbols, $L(d_k)$ is a fixed mapping of PAM4 symbols to their corresponding signal levels, and $n_k$ represents the noise plus some other impairments.

A summer 406 combines the filtered receive signal with a feedback signal $f_k$ to produce an equalized signal $s_k$ having reduced trailing ISI and thus (in the absence of significant channel noise) having open decision eyes such as those of FIG. 3. A slicer 408 compares the equalized signal to the decision thresholds to determine the symbol decisions $\hat{d}_k$. A symbol mapper 410 converts the symbol to its target level $L(\hat{d}_k)$, enabling a subtractor 409 to calculate the equalization error $e_k$. A delay element 412 latches the target level $L(\hat{d}_k)$, making it available during the next symbol interval as the preceding symbol target level $L(\hat{d}_{k-1})$. A multiplier 414 scales the symbol mapper output by a feedback filter coefficient $\gamma$ to produce the feedback signal $f_k$ for summer 406.

A post-processor 420 operates on the symbol decisions and equalization error to detect and correct symbol decision errors. Before discussing implementation details, we provide the following derivation to facilitate understanding.

Without loss of generality, the following discussion assumes the nominal signal range is $-3$ to $+3$, such that the signal levels for symbols 0, 1, 2, 3, are $-3$, $-1$, $+1$, and $+3$, respectively. The equalized signal $s_k$ is expressible as:

$$s_k = y_k - \gamma \cdot L(\hat{d}_{k-1}) \qquad (2)$$

or equivalently as:

$$s_k = L(d_k) + \gamma [L(d_{k-1}) - L(\hat{d}_{k-1})] + n_k \qquad (3)$$

When a decision error happens such that $d_{k-1} \neq \hat{d}_{k-1}$, $$|L(d_{k-1}) - L(\hat{d}_{k-1})| \geq 2, \qquad (4)$$

which for the contemplated range of signal to noise ratios (SNR) can be assumed to mean $$L(d_{k-1}) - L(\hat{d}_{k-1}) = \pm 2 \text{ when } d_{k-1} \neq \hat{d}_{k-1}. \qquad (5)$$

In the presence of a decision error, the equalized signal is shifted from its desired value by $\gamma[L(d_{k-1}) - L(\hat{d}_{k-1})] = \pm 2\gamma$. In high baud rate systems, the DFE tap $\gamma$ is typically greater than or equal to 0.5, and often about 1.0. This shift exceeds the distance between the symbol level and the decision threshold, likely causing the decision error to propagate from one symbol interval to the next, causing an extended error burst until $$\hat{d}_k = 3 \text{ with } L(d_{k-1}) - L(\hat{d}_{k-1}) > 0, \text{ or} \qquad (6a)$$

$$\hat{d}_k = 0 \text{ with}(d_{k-1}) - L(\hat{d}_{k-1}) < 0 \qquad (6b)$$

Alternatively, a sufficiently large noise signal $n_k$ could theoretically overcome the decision error shift to end the error burst, but in the contemplated SNR range $|n_k|<1.0$ with high probability so we neglect this alternative herein and focus on the conditions given in equations (6a) and (6b).

Equations (6a) and (6b) are defined as the error exit conditions, with the corresponding $d_k$ designated herein as the "error exit symbol". The following discussion shows that the equalization error associated with error exit symbols is conspicuously larger than the expected error level.

We define error sign $se_k=\text{sgn}(L(d_k)-L(\hat{d}_k))$, meaning $se_k \in \{\pm 1\}$ in the presence of a decision error $d_{k-1} \neq \hat{d}_{k-1}$, $$s_k = L(d_k) + 2\gamma \cdot se_{k-1} + n_k \tag{7}$$

To simplify this discussion, assume for the moment $\gamma=1$. If the error exit conditions (6a), (6b) are not satisfied, we have the following:

$$L(d_k)-L(\hat{d}_k) = -1 \cdot [L(d_{k-1})-L(\hat{d}_{k-1})] \tag{8}$$

$$se_k = -1 \cdot se_{k-1} \tag{9}$$

Assume the error exit conditions are not satisfied until $d_{k+\Delta}$, i.e., $\hat{d}_{k-1}, \hat{d}_k, \ldots, \hat{d}_{k+\Delta}$ are burst errors. The following equations can be derived for the burst errors:

$$se_{k+i} = (-1)^i \cdot se_k, 0 \le i \le \Delta \tag{10}$$

$$L(d_{k+i})-L(\hat{d}_{k+i}) = (-1)^i \cdot [L(d_k)-L(\hat{d}_k)], 0 \le i \le \Delta \tag{11}$$

Define equalization error $e_k$ as $$e_k = s_k - L(\hat{d}_k) \tag{12}$$

Consider the equalization error in three cases: no decision errors, burst errors, and error exit symbols. If there are no decision errors, $d_{k-1}=\hat{d}_{k-1}$, $d_k=\hat{d}_k$ The equalization error is $$e_k = n_k \tag{13}$$

If there are burst errors $d_{k-1} \neq \hat{d}_{k-1}$, $d_k \neq \hat{d}_k$, from (3), (11) and (12), the equalization error is $$e_k = s_k - L(\hat{d}_k) = L(d_k)-L(\hat{d}_k)+L(d_{k-1})-L(\hat{d}_{k-1})+n_k \tag{14}$$

$$e_k = n_k \tag{15}$$

Now, if the burst errors exit at $d_{k+\Delta}$, i.e., $\hat{d}_{k+\Delta}$ satisfies the error exit condition (6a) or (6b), $d_{k+\Delta}=\hat{d}_{k+\Delta}$, $L(d_{k+\Delta})=L(\hat{d}_{k+\Delta})$. From Equation (3), (5) and (11), the equalization error $e_{k+\Delta}$ is given as follows.

$$e_{k+\Delta}=s_{k+\Delta}-L(\hat{d}_{k+\Delta})=(-1)^\Delta \cdot [L(d_{k-1})-L(\hat{d}_{k-1})]+n_{k+\Delta} \tag{16}$$

$$e_{k+\Delta}=(\pm 2)+n_{k+\Delta} \tag{17}$$

In the contemplated SNR range $|n_k|<1.0$ with high probability, so that the equalization error in equation (17) is conspicuously different from the equalization error of equations (13) and (15). As $\gamma$ falls below 1, the equalization error of equation (15) grows as the error of equation (17) falls, but depending on SNR they may remain distinguishable until $\gamma$ approaches 0.5, and in any case they should be readily distinguishable from the equalization error when no decision errors are present.

Summarizing the equalization errors computed in (13), (15) and (17), we have the following:

No decision errors: $e_k = n_k$
Burst errors: $e_k = n_k$
Error exit symbols: $e_k = (\pm 2) + n_k$ Above computations show that equalization error of the error exit symbol $e_{k+\Delta}$ has magnitude around 2 which is conspicuously larger than the equalization error in the absence of decision errors and during burst errors. We may use this property in combination with the error exit conditions to detect the burst errors for DFE with large feedback tap values.

For a programmable error threshold $T_e$, if $|e_k|>T_e$ and symbol decision $\hat{d}_k \in \{0,3\}$, then $\hat{d}_k$ is declared as the error exit symbol and $d_{k-1}$ is likely a single error or the end of an error burst. (The feedback tap coefficient $\gamma$ is a good choice for the value of threshold $T_e$.) Once the possible errors are detected, an efficient maximum likelihood (ML) search may be performed to verify whether the possible errors are indeed errors and, if so, to correct them.

To illustrate the ML search method, assume $\hat{d}_k$ is declared as the error exit symbol, and let M be the maximum length of the trace back from $\hat{d}_k$, i.e., the ML search is performed within the window from $\hat{d}_k$ to $\hat{d}_{k-M}$. Define the initial (varying-length) decision sequences as:

$$\underline{\hat{d}}_i = [L(\hat{d}_{k-1}),L(\hat{d}_{k-2}),\ldots,L(\hat{d}_{k-i})], 1 \le i \le M \tag{18}$$

with competing decision sequences:

$$\underline{\hat{d}'}_i = \underline{\hat{d}}_i + 2se_k \cdot [(-1)^0,(-1)^1,\ldots,(-1)^{i-1}], 1 \le i \le M \tag{19}$$

In (19), $se_k$ is redefined as $se_k = \text{sgn}(e_k)$, and this definition is used for $se_k$ in the remaining part of this description. For the sequence of filtered receive signals $\underline{Y}=\{y_{k-1},y_{k-1},\ldots,y_{k-i}\}$, the likelihood of $\underline{\hat{d}}_i$ is computed as:

$$Pr\{\underline{Y}|\underline{\hat{d}}_i\} \propto P_i = -\Sigma_{j=0}^{i}(y_{k-j}-\hat{y}_{k-j})^2, \tag{20}$$

where $$\hat{y}_{k-j}=L(\hat{d}_{k-j}))+\gamma \cdot L(\hat{d}_{k-j-1}) \tag{21}$$

It can be shown from the combination of (2), (12), and (21), that $$e_{k-j} = y_{k-j}-\hat{y}_{k-j} \tag{22}$$

The likelihood of $\underline{\hat{d}'}_i$ is computed as:

$$Pr\{\underline{Y}|\underline{\hat{d}'}_i\} \propto P'_i = -\Sigma\Sigma_{j=0}^{i}(y_{k-j}-\hat{y}'_{k-j})^2, \tag{23}$$

where $$\hat{y}'_{k-j}=L(\hat{d}'_{k-j})+\gamma \cdot L(\hat{d}'_{k-j-1}). \tag{24}$$

In (24), $\hat{d}'_{k-j}$ and $L(\hat{d}'_{k-j})$ are given by $$\hat{d}'_{k-j}=\hat{d}_{k-j}+se_k \cdot (-1)^{j-1}, 1 \le j \le i, \tag{25}$$

$$L(\hat{d}'_{k-j})=L(\hat{d}_{k-j})+2 \cdot se_k \cdot (-1)^{j-1}, 1 \le j \le i \tag{26}$$

We note that $L(\hat{d}'_k)=L(\hat{d}_k)$ and $\hat{d}'_k=\hat{d}_k$ since $\hat{d}_k$ is assumed to be the error exit symbol.

Let the competing error $e'_{k-j}$ be defined by $$e'_{k-j}=y_{k-j}-\hat{y}'_{k-j} \tag{27}$$

It can be shown that $$\hat{e}'_{k-j}=e_{k-j}-\Delta e_{k-j} \tag{28}$$

$$\Delta e_{k-j}=L(\hat{d}'_{k-j})-L(\hat{d}_{k-j})+\gamma \cdot (L(\hat{d}_{k-j-1})-L(\hat{d}_{k-j-1})) \tag{29}$$

In (29) $L(\hat{d}'_{k-j})=L(\hat{d}_{k-j})$, when $j=0$ and $j=(i+1)$.

Define $\Delta P_i = P_i - P'_i$. After some mathematical operations, it can be shown that $\Delta P_i$ is given by $$\Delta P_i = \Sigma_{j=0}^{i}[(\Delta e_{k-j})^2 - 2 \cdot \Delta e_{k-j} \cdot e_{k-j}] \tag{30}$$

If $i=1$, $$\Delta P_i = 4\gamma^2 - 4 \cdot \gamma \cdot se_k \cdot e_k + 4 - 4 \cdot se_k \cdot e_{k-1} \tag{31}$$

If $i>1$, $$\Delta e_{k-j} = 2se_k \cdot (-1)^{j-1} \cdot (1-\gamma), 1 \leq j \leq i, \quad (32)$$

$$\Delta P_i = 4(\gamma^2 - \gamma \cdot se_k \cdot e_k + 1 - se_k \cdot (-1)^{i-1} \cdot e_{k-i} - \Sigma_{j=1}^{i-1} ce_{k-j}) \quad (33)$$

where $ce_{k-j}$ is given by $$ce_{k-j} = (1-\gamma)^2 - se_k \cdot (1-\gamma) \cdot (-1)^{j-1} \cdot e_{k-j} \quad (34)$$

When the DFE tap $\gamma=1$, $$ce_{k-j} = 0, 1 \leq j \leq i, \quad (35)$$

Omitting the common factor 4, from (33), the $\Delta P_i$ computation is further simplified to:

$$\Delta P_i = \gamma^2 - \gamma \cdot se_k \cdot e_k + 1 - se_k \cdot (-1)^{i-1} \cdot e_{k-i} \quad (36)$$

Now let $$\Delta P_{i\_min} = \min_{1 \leq i \leq M} (\Delta P_i).$$

If $\Delta P_{i\_min} < 0$, the previous i_min decisions $\hat{d}_{k-j}$, $1 \leq j \leq $ i_min are errors that should be corrected, replacing $\hat{d}_{k-j}$ with $$d'_{k-j} = \hat{d}_{k-j} + se_k \cdot (-1)^{j-1}, 1 \leq j \leq i\_min \quad (38)$$

Conversely, if $\Delta P_{i\_min} \geq 0$, the decisions $\hat{d}_{k-j}$, $1 \leq j \leq M$, do not need to be changed.

If there exists j, $1 \leq j \leq M$, such that the competing symbol decision is invalid, i.e., $d'_{k-j} \notin \{0, 1, 2, 3\}$, then let J be the minimum of such values, such that J−1 is the number of potential error burst lengths. The $\Delta P_i$ only needs to be computed for $1 \leq i \leq J$ instead of $1 \leq i \leq M$, and the rest of the process remains unchanged.

Now, we summarize the proposed DFE postprocessing method as follows: (A) Monitor symbol decisions for an error exit symbol (a symbol $\hat{d}_k \in \{0,3\}$ with $|e_k| > T_e$). (B) when an error exit symbol is detected, compute the likelihood differences $\Delta P_i$ for different burst lengths $1 \leq i \leq \min\{M, J\}$. (C) Find the minimum likelihood difference and corresponding index i_min, $$\Delta P_{i\_min} = \min_{1 \leq i \leq M} (\Delta P_i).$$

(D) If $\Delta P_{i\_min} < 0$, then replace decisions $\hat{d}_{k-j}$, $1 \leq j \leq $ i_min, with competing symbol decisions $d'_{k-1}$. If $\Delta P_{i\_min} \geq 0$, no correction is needed.

The limit on trace back length M can be set to, e.g., 32, without adding undue complexity. Other limits can also be evaluated empirically for suitability. The main computation load of the proposed algorithm is the sequence metric $\Delta P_i$ computation in (33) and (34). Note that the $\gamma^2$, $(1-\gamma)^2$ and $(1-\gamma)$ only need to be computed once for large chunk of data; and $se_k \in \{\pm 1\}$. The overall computation complexity of the algorithm is substantially lower than that for maximum likelihood sequence detectors (MLSD) or even than for the reduced complexity 2-state MLSD described in co-pending application Ser. No. 17/656,751.

Figure 5:
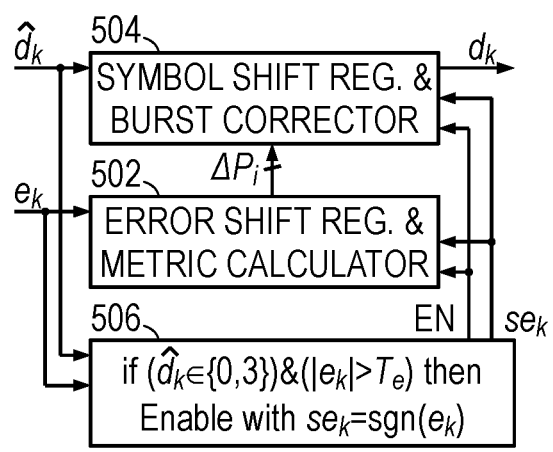
FIG. 5 is a block diagram of an illustrative post-processor.

FIG. 5 is a block diagram of an illustrative post-processor 420. It includes a metric circuit 502 that operates on the sequence of equalization errors $e_k$ and prospective error signs $se_k$ to produce likelihood differences $\Delta P_i$ for the potential error burst lengths. A corrector circuit 504 operates on the likelihood differences $\Delta P_i$ to find the minimum likelihood difference and its corresponding index i_min. If the minimum likelihood difference is less than zero, the corrector circuit 504 replaces the i_min symbol decisions preceding the error exit symbol with their competing symbol decisions.

A control circuit 506 evaluates the sequence of symbol decisions and equalization errors from the decision feedback equalizer to detect potential error exit symbols, enabling metric circuit 502 and corrector circuit 504 to operate only when such symbols are detected. Note that circuits 502, 504 have shift registers that continue to operate when these circuits are "disabled". It is these shift registers that enable the post-processing operation of the corresponding circuits.

Figure 6:
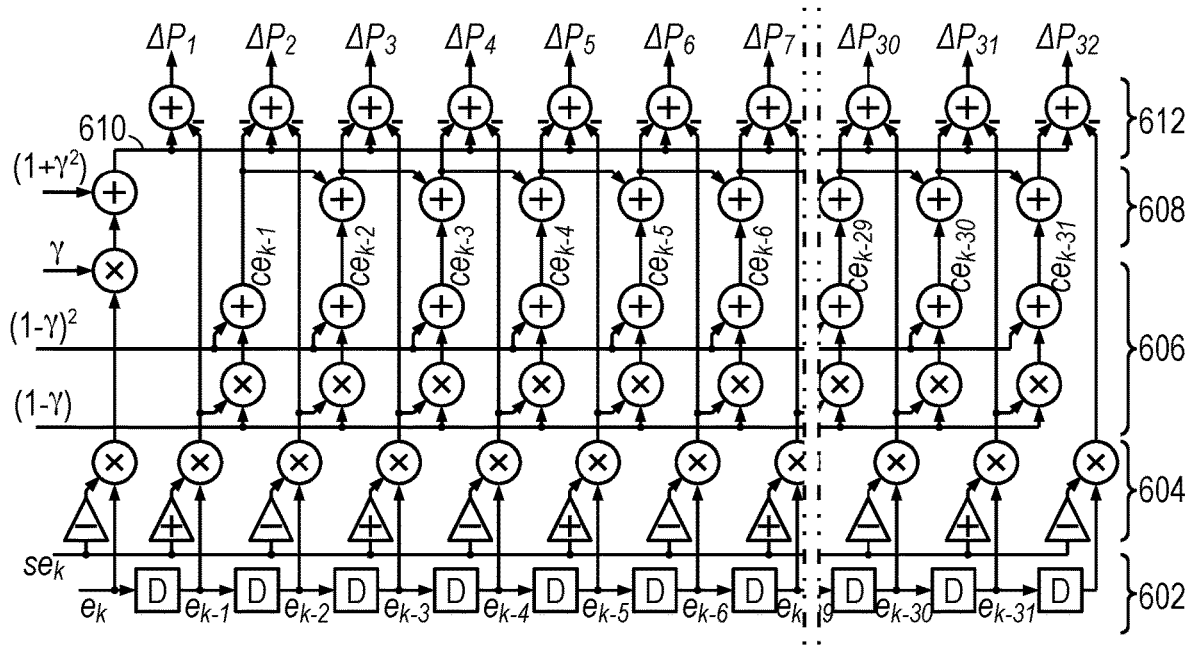
FIG. 6 is a schematic of an illustrative metric circuit.

FIG. 6 shows one illustrative implementation of the metric circuit 502. It includes a shift register 602 for buffering past equalization errors $e_k$ to be used for the metric calculation. A set of inverters 604 (shown here as multipliers) applies alternate sign changes to the past equalization errors $e_k$ as dictated by error sign $se_k$. A set of multipliers and adders 606 scale and shift the inverter outputs to complete the computations given by equation (34). A set of cumulative adders 608 performs the summations shown in equation (33).

On the left side of FIG. 6, an inverter, multiplier, and adder produce a signal 610 representing the first three terms of equation (33), which are shared for all likelihood difference calculations. Along the top of FIG. 6, a set of adders 612 combines the various terms to provide each of the likelihood differences $\Delta P_i$ for different potential burst lengths, which are provided to corrector circuit 504.

Figure 7:
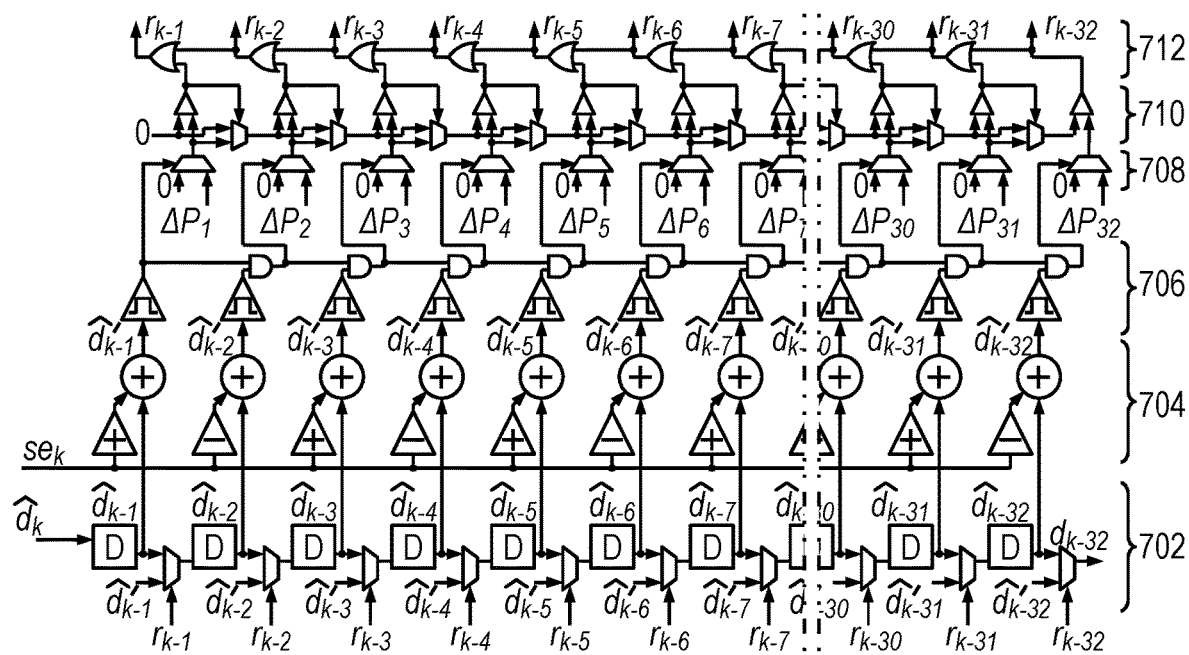
FIG. 7 is a schematic of an illustrative corrector circuit.

FIG. 7 shows one illustrative implementation of corrector circuit 504. The circuit includes a symbol decision shift register 702 with multiplexers for optionally replacing some of the symbol decisions $\hat{d}_{k-j}$ with competing symbol decisions $d'_{k-j}$ when the corresponding replacement control signals $r_{k-j}$ are asserted. A set of adders 704 adds the prospective error sign $se_k$ (with alternate sign changes) to the past symbol decisions to calculate the competing symbol decisions $d'_{k-j}$, which are not necessarily valid decision symbols. An evaluation circuit 706 includes a set of comparators to determine whether each of the competing symbol decisions are in the range between 0 and M−1 (inclusive), and if so, to assert the comparator output. The evaluation circuit 706 includes a chain of logical AND gates to pass the comparator output only if all of the more recent competing symbol decisions are also valid, and to block the comparator output otherwise. For those comparator outputs that are asserted and passed by the AND gates, a set of multiplexers 708 selects the corresponding likelihood differences $\Delta P_i$ from the metric circuit 502; otherwise the multiplexers output zero. A chain of compare-and-select (CAS) units 710 each pass the smaller of their inputs, thereby determining a minimum likelihood difference. The comparator outputs of the CAS units are combined by a chain of logical OR gates 712 to derive the replacement control signals $r_{k-j}$ for the multiplexers of the shift register 702.

Figure 8:
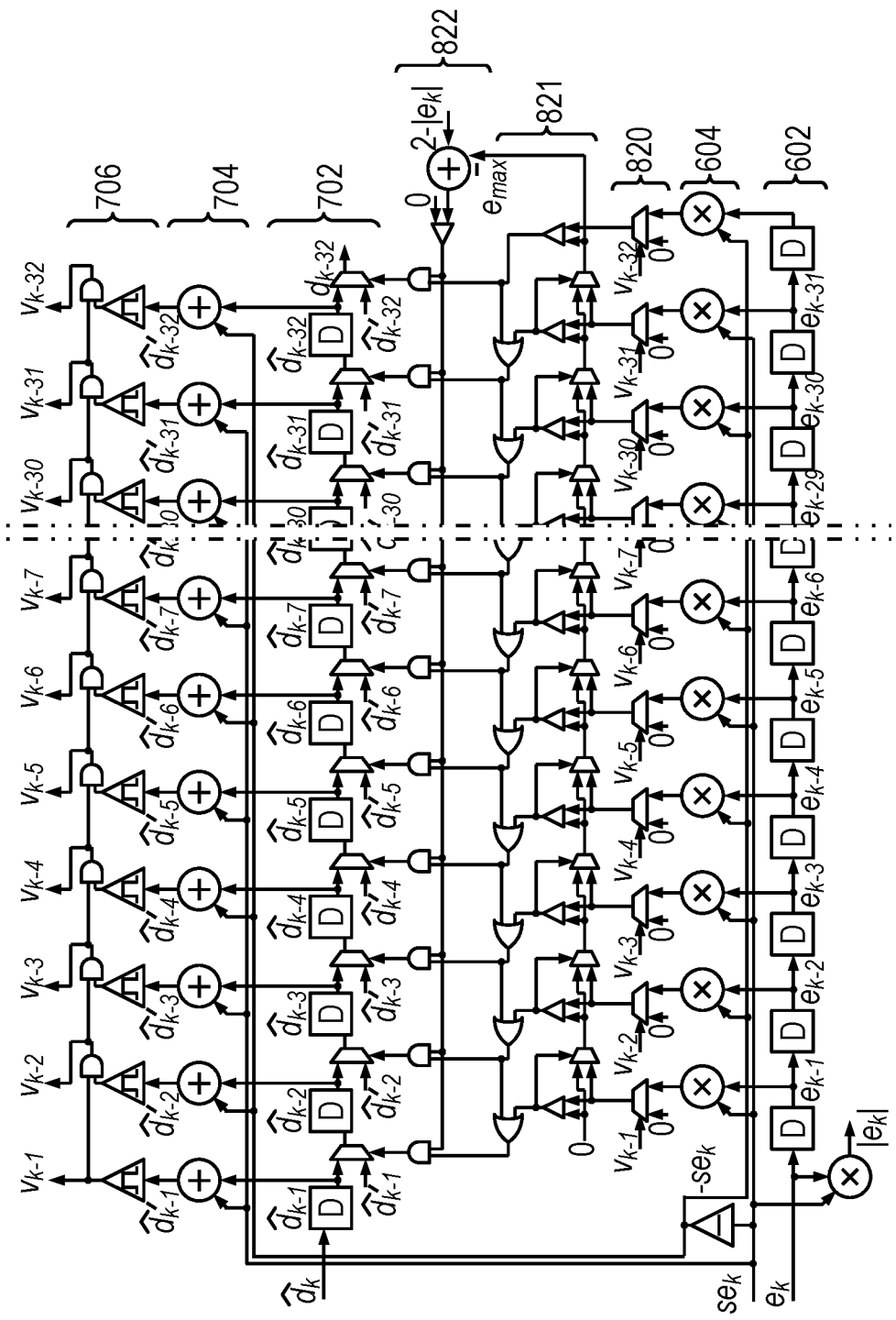
FIG. 8 is a schematic of an alternative corrector circuit.

When the DFE tap $\gamma=1$, the post-processor can be simplified. FIG. 8 shows an illustrative implementation for this case. It includes the shift register 602 and inverters 604 to apply alternate sign changes to the past equalization errors. With reference to equation 36, we observe that the minimum likelihood difference will be determined by the maximum of the sign-changed errors for the valid competing symbol decisions. The validity signals $v_{k-i}$ are determined as in FIG. 7 from the symbol decision shift register 702, the adders 704, and evaluation circuit 706.

A set of multiplexers 820 pass the sign-changed errors for the valid competing symbol decisions. A chain of compareand-select (CAS) units 821 each pass the larger of their inputs, thereby determining $e_{max}$, the maximum of the sign-changed errors. The comparator outputs of the CAS units are combined by a chain of logical OR gates to derive the replacement control signals $r_{k-j}$ for the multiplexers of the shift register 702. Note, however, a set of AND gates 822 blocks the replacement control signals unless equation (36) using $e_{max}$ produces a negative value, in which case it is desired to replace the original symbol decisions with their competing symbol decisions.

Figure 9:
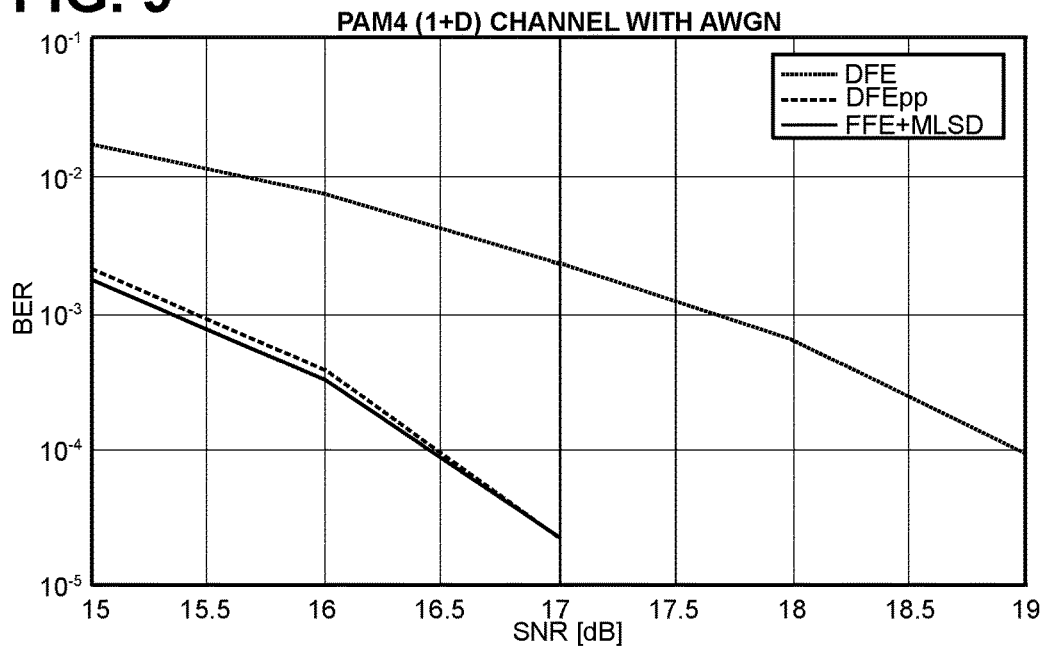
FIG. 9 is a graph of BER vs. SNR for a 1+D channel response.
Figure 10:
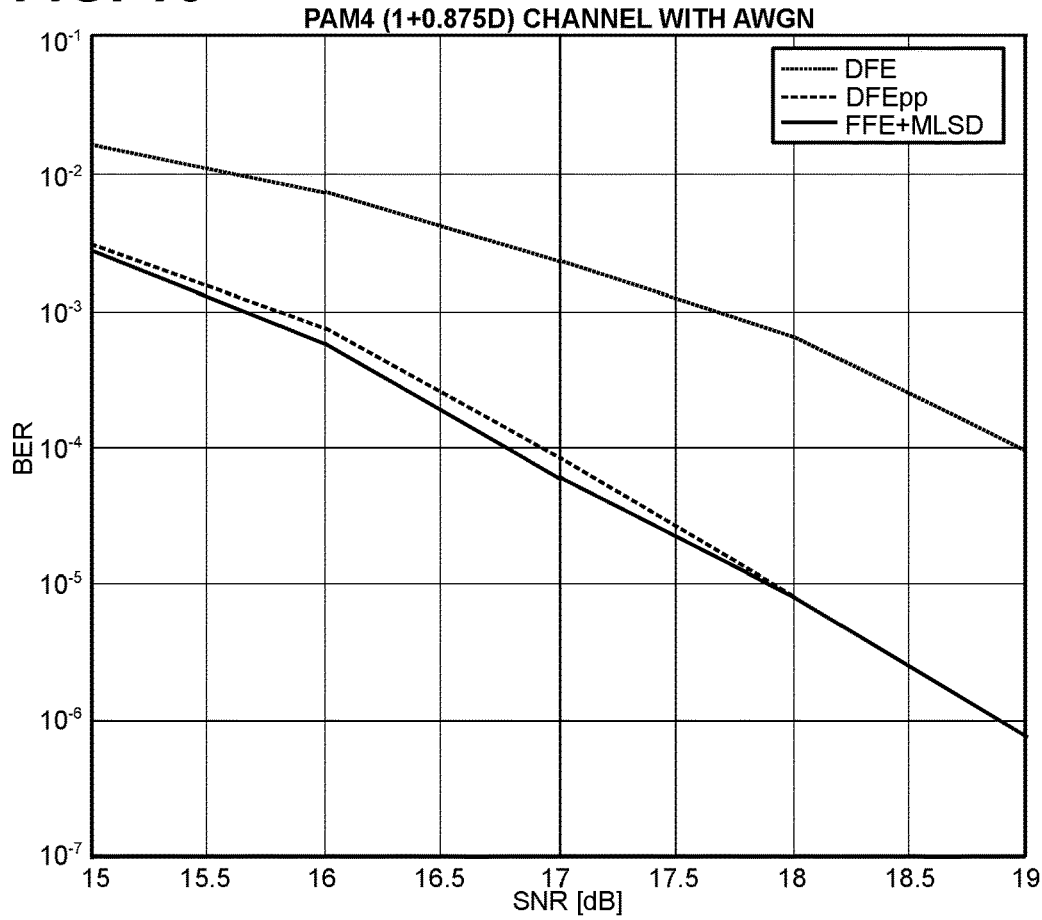
FIG. 10 is a graph of BER vs. SNR for a 1+0.875D channel response.

FIG. 9 is a graph comparing performances of a traditional DFE and traditional MLSD with the disclosed DFE with post-processing (DFEpp) for a simulated PAM4 signal having a 1+D channel response with additive white Gaussian noise (AWGN). It is observed that in the region of interest, the DFEpp essentially matches the MLSD performance, improving on the traditional DFE performance by about 2 dB of channel signal to noise ratio (SNR). Similar results are observed in FIG. 10, which compares the receiver performances for a simulated channel response of 1+0.875D.

Numerous alternative forms, equivalents, and modifications will become apparent to those skilled in the art once the above disclosure is fully appreciated. Though PAM4 was used for the foregoing discussions, the disclosed principles are applicable to larger PAM constellations and to QAM signaling. Though a positive feedback coefficient value was presumed, the disclosed principles are similarly applicable with negative feedback coefficient values. Moreover, the disclosed analysis is readily extendible to multiple feedback taps for DFEs with suitable coefficient values. It is intended that the claims be interpreted to embrace all such alternative forms, equivalents, and modifications that are encompassed in the scope of the appended claims.

What is claimed is:

1. A receiver comprising:
   a decision feedback equalizer that derives symbol decisions from a filtered receive signal;
   a subtractor that determines an equalization error for each symbol decision; and
   a post-processor that operates on the symbol decisions and the equalization errors to detect and correct symbol decision error bursts.

2. The receiver of claim 1, wherein the post-processor detects burst error exit symbols by comparing a magnitude of the equalization errors to a threshold.

3. The receiver of claim 2, further comprising a feed forward filter that operates on a receive signal to provide the filtered receive signal, thereby shaping a channel response to 1+γD, wherein D is a unit delay operator and γ is a coefficient representing trailing intersymbol interference.

4. The receiver of claim 3, wherein the threshold is programmable.

5. The receiver of claim 2, wherein the decision feedback equalizer derives M-ary PAM symbol decisions, M>2, and the burst error exit symbols are limited to 0 and (M−1).

6. The receiver of claim 2, wherein the post-processor includes a metric circuit to determine a likelihood difference for each of multiple different error burst lengths.

7. The receiver of claim 6, wherein the post-processor further includes a corrector circuit that finds a minimum likelihood difference and, if the minimum likelihood difference so indicates, corrects a corresponding number of decision errors preceding the burst error exit symbol.

8. The receiver of claim 7, wherein the metric circuit and the corrector circuit are disabled until a burst error exit symbol is detected.

9. A receiving method comprising:
   using a decision feedback equalizer to derive symbol decisions from a filtered receive signal;
   determining an equalization error for each symbol decision; and
   processing the symbol decisions and the equalization errors to detect and correct symbol decision error bursts.

10. The method of claim 9, wherein said processing includes comparing the equalization errors to a threshold to detect burst error exit symbols.

11. The method of claim 10, wherein a channel response of the filtered receive signal is 1+γD, wherein D is a unit delay operator and γ is a coefficient representing trailing intersymbol interference, and wherein the threshold equals γ.

12. The method of claim 10, wherein the decision feedback equalizer derives M-ary PAM symbol decisions, M>2, and wherein as part of detecting the burst error exit symbols, said comparing is performed only for minimum and maximum symbol decision values.

13. The method of claim 10, wherein said processing includes determining a likelihood difference for each of multiple different error burst lengths.

14. The method of claim 13, wherein said processing further includes finding a minimum likelihood difference for each burst error exit symbol and, if the minimum likelihood difference is negative, corrects a corresponding number of decision errors preceding that burst error exit symbol.

15. A semiconductor intellectual property core that generates circuitry comprising:
   a decision feedback equalizer that derives symbol decisions from a filtered receive signal;
   a subtractor that determines an equalization error for each symbol decision; and
   a post-processor that operates on the symbol decisions and the equalization errors to detect and correct symbol decision error bursts.

16. The semiconductor intellectual property core of claim 15, wherein the post-processor comprises a comparator that compares the equalization errors to a threshold to detect burst error exit symbols.

17. The semiconductor intellectual property core of claim 16, wherein a channel response of the filtered receive signal is 1+γD, wherein D is a unit delay operator and γ is a coefficient representing trailing intersymbol interference, and wherein the threshold is programmable.

18. The semiconductor intellectual property core of claim 16, wherein the decision feedback equalizer derives M-ary PAM symbol decisions, M>2, and wherein said burst error exit symbols are limited to a minimum symbol decision value and a maximum symbol decision value.

19. The semiconductor intellectual property core of claim 16, wherein the post-processor includes a metric circuit configured to determine a likelihood difference for each of multiple different error burst lengths.

20. The semiconductor intellectual property core of claim 19, wherein the post-processor further includes a corrector circuit configured to find a minimum likelihood difference for each burst error exit symbol and, if the minimum likelihood difference indicates a decision error is present, configured to correct a corresponding number of decision errors preceding that burst error exit symbol.

* * * * *